Sept. 13, 1927. 1,642,207
J. M. JONES
WIRE WHEEL
Filed Nov. 12 1926 2 Sheets-Sheet 1
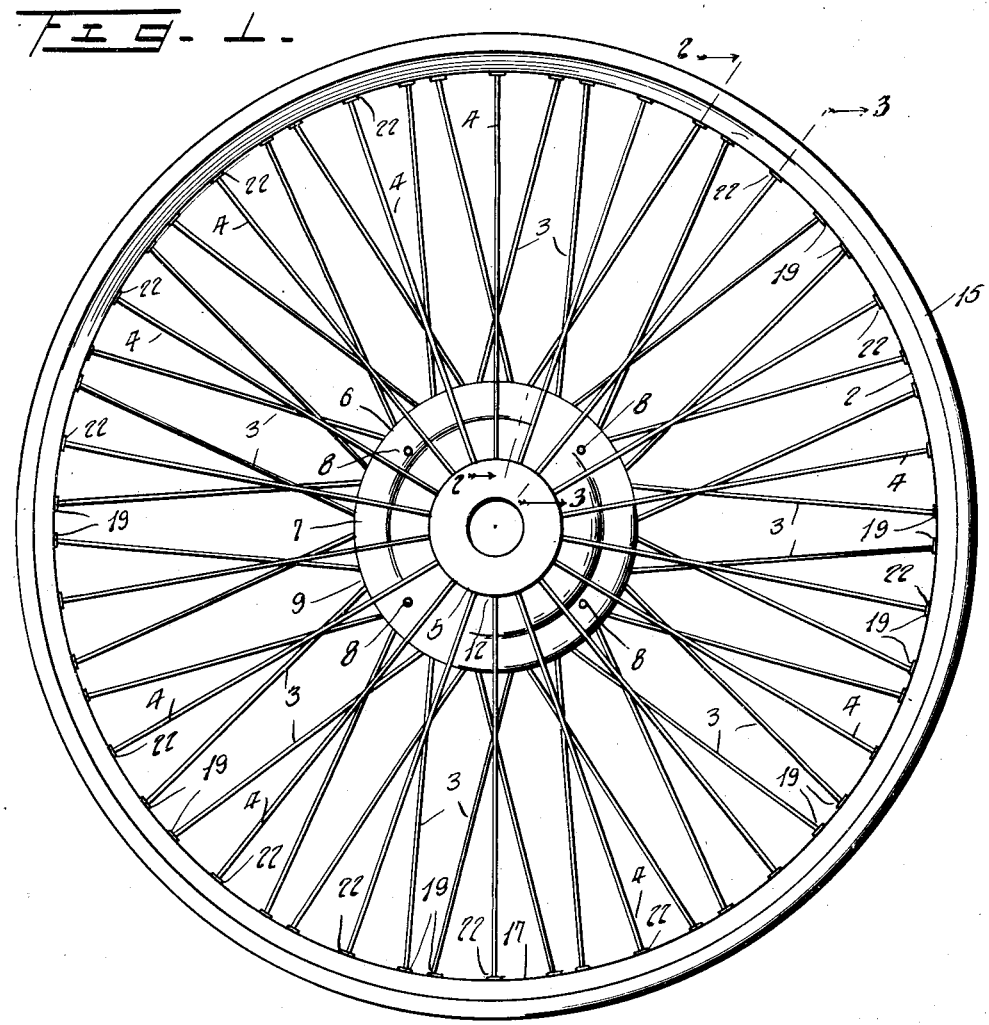
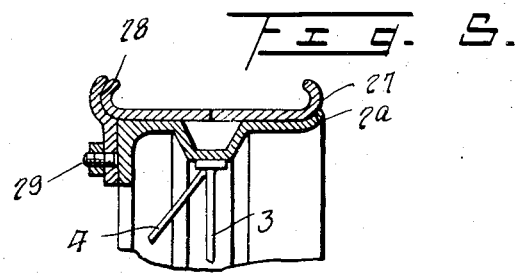
Inventor
J. M. Jones.
Attorney Sept. 13, 1927.
J. M. JONES
1,642,207
WIRE WHEEL
Filed Nov. 12 1926
2 Sheets-Sheet 2
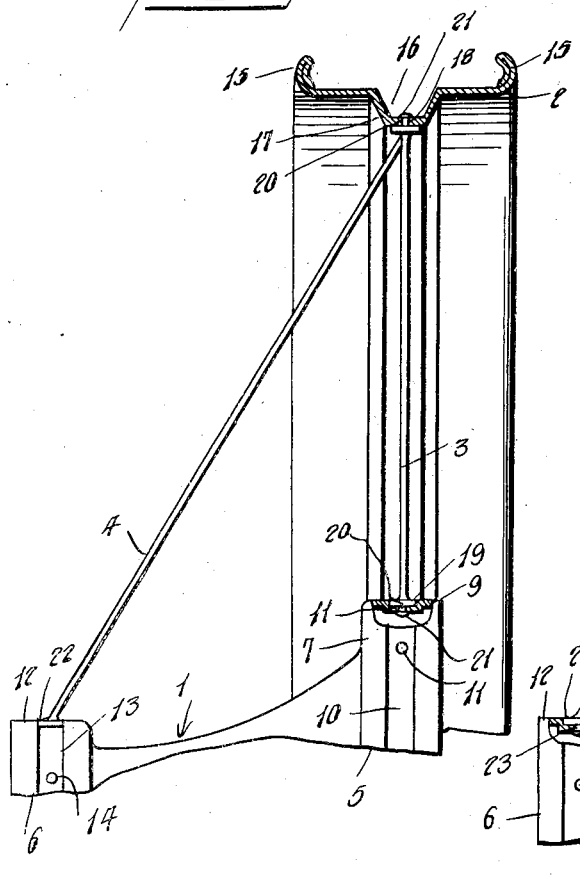
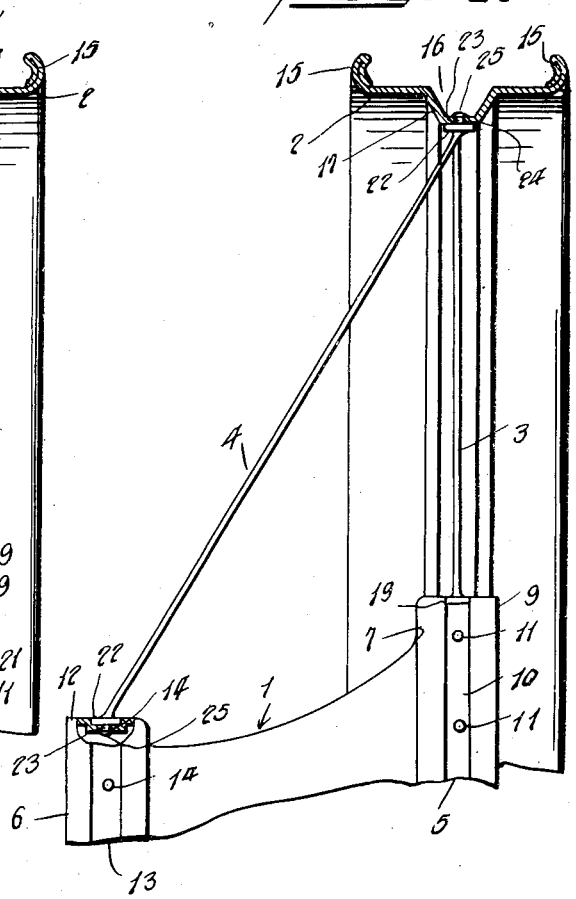
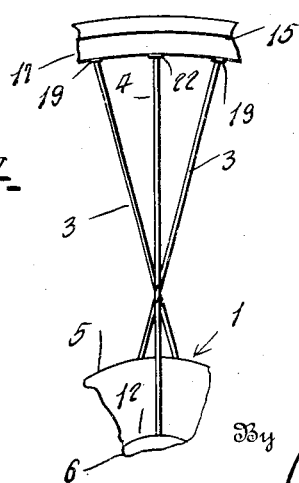
Inventor
J. M. Jones.
By
Attorney Patented Sept. 13, 1927.

1,642,207

UNITED STATES PATENT OFFICE.

JAMES M. JONES, OF HAMILTON, OHIO, ASSIGNOR OF TWELVE AND ONE-HALF PER CENT TO CHRIST BUETTNER AND TWENTY-FIVE PER CENT TO RALPH A. KENNEDY, BOTH OF HAMILTON, OHIO.

WIRE WHEEL.

Application filed November 12, 1926. Serial No. 148,002. REISSUED

This invention relates to wire wheels, and has for one of its objects to improve and simplify the general construction of wheels of this character and to provide one which shall be adapted to be applied to the front spindles or the rear axles of any automobile and which shall have the hub, rim and spokes thereof welded together in a manner to render it strong and durable.

With the foregoing and other objects in view, the nature of which will become apparent as the description proceeds, the invention consists of the construction, combination and arrangement of parts hereinafter fully described and claimed, and illustrated in the accompanying drawings, wherein:

Figure 1 is an elevational view of a wire wheel embodying my invention,

Figure 2 is a sectional view taken on the plane indicated by the line 2—2 of Figure 1, Figure 3 is a sectional view taken on the plane indicated by the line 3—3 of Figure 1, Figure 4 is an elevational view on an enlarged scale of a fragmentary portion of the wheel, and Figure 5 is a view partly in elevation and partly in vertical section of a modified form of the wheel.

Referring in detail to the drawings, in the several views of which like reference characters denote like parts, 1 designates the hub, 2 the rim, 3 the inner spokes and 4 the outer spokes of the wheel. The hub 1 is provided with inner and outer enlarged ends 5 and 6, respectively, and may embody a construction to adapt the wheel for application to the front spindles or for application to the rear axles of any automobile. The hub ends 5 and 6 are of substantially cylindrical formation, and the hub end 5 is larger diametrically than the hub end 6. The hub end 5 is provided in the circular wall 7 thereof with openings 8 for the reception of the dowel pins which constitute part of the means for connecting wire wheels to front spindles and rear axles of automobiles. The annular wall 9 of the hub end 5 is provided with an annular depression or groove 10, and openings 11 are formed in the bottom wall of the depression or groove. The hub end 6 is provided in its annular wall 12 with an annular depression or groove 13 in the bottom wall of which are formed openings 14.

The rim 2 is provided with inwardly rolled or beaded edges 15, and is provided centrally between its edges with an annular depression or groove 16 which provides an annular rib 17 at the inner side thereof. The rim 2 is a one piece structure, and the rib 17 thereof is provided with openings 18.

The inner spokes 3 are shorter than the outer spokes 4, and are positioned between the hub end 5 and rim rib 17. The ends of the spokes 3 are laterally enlarged as shown at 19, and are positioned in the groove 10 and in contact with the rib 17. Pins 20 extend from the ends of the spokes 3 and pass through the openings 11 in the hub end 5 and the openings 18 in the rib 17. The ends 19 and the pins 20 of the spokes 3 are welded to the hub end 5 and rib 17, and during the welding process the pins 20 are upset to provide heads 21 which clamp the hub end 5 and rib 17 between themselves and the enlarged ends 19 of the spokes. The spokes 3 are arranged in pairs, and the spokes of each pair are arranged in crossed relation.

The outer spokes 4 extend from the hub end 6 to the rim rib 17. The ends of these spokes are enlarged as shown at 22. There is provided one outer spoke for each pair of the inner spokes 3, and each spoke 4 is arranged in a plane which intersects the point of crossing of each pair of the spokes 3. The enlarged inner ends 22 of the spokes 4 fit in the groove 13 and the enlarged outer ends of these spokes contact with the rib 17, and to permit said ends to be arranged in full abutting relation with the bottom wall of the groove and with the rib they are arranged at an angle to the spokes. These spokes are provided at their ends with pins 23 which pass through the openings 14 and through openings 24 in the rib 17. The ends 22 and pins 23 of the spokes 4 are welded to the hub end 6 and rib 17, and during the welding operation the ends of the pins are upset to provide heads 25 which clamp the hub end 6 and rib 17 between themselves and the enlarged ends 22 of the spokes 4.

Any of the many well known different types of welding apparatus may be employed to secure the spokes 3 and 4 and their pins to the hub ends 5 and 6 and to the rim rib 17. The rim 2 is provided with an opening, not shown, for the reception of the valve stem of the tire to be mounted thereon. The ribs or beads 15 serve to retain the tire on the rim 2. If desired, the wheel may be provided with a rim of the type shown in Figure 5. This rim 2ª is similar to the rim 2 with the exception that it is provided with a fixed flange 27 and a removable flange 28 to adapt it for the reception of a demountable tire carrying rim. The removable flange 28 is secured in place by elements 29.

All parts of the wheel are made of metal, and any desirable metal or metals may be employed in the construction of the several parts thereof. Due to the manner in which the spokes 3 and 4 are secured to the hub 1 and rim 2, the wheel is strong and durable. The firmest connection between the spokes 3 and 4 and hub 1 and rim 2 is established, due to the fact that the enlarged ends of the spokes are welded to the hub and rim, due to the fact that the inner ends of the spokes are positioned in grooves formed in the hub, and due to the fact that the pins of the spokes pass through and are welded to the hub and rim and have their ends upset into engagement with the hub and rim.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. A metal wheel comprising a hub provided with enlarged inner and outer ends, the inner hub end being larger than the outer end thereof, a rim, spokes extending from the inner end of the hub to the rim and being arranged in pairs and the spokes of each pair arranged in crossed relation, and spokes connected to the outer hub end and rim, there being one of the outer spokes for each pair of inner spokes and each outer spoke being arranged in a plane intersecting the point of crossing of each pair of inner spokes.

2. A metal wheel comprising a hub, a rim, and spokes provided with enlarged ends welded to one of said parts and provided at said ends with pins engaging and welded to such part.

3. A metal wheel having a hub provided with a groove, the bottom wall of the groove being provided with openings, and spokes having their inner ends secured in the openings and provided at said ends with enlarged portions fitting in the groove.

4. A metal wheel having a hub provided with a groove, the groove being provided in the bottom wall thereof with openings, and spokes having their inner ends positioned in said openings and provided at said ends with enlarged portions fitting in the grooves, and said ends and their enlarged portions being welded to the hub.

5. A metal wheel comprising a hub, a rim, one of said parts being provided with openings, and spokes having enlarged ends contacting with the part having the openings and provided with pins passing through the openings, the enlarged ends and pins being welded to said part and the pins being upset to provided heads between which and the enlarged ends said part is clamped.

6. A metal wheel comprising a hub provided at the inner and outer ends thereof with grooves, the bottom walls of the grooves being provided with openings, and spokes having enlarged ends and provided at said ends with pins, the enlarged ends fitting in the grooves and the pins passing through the openings, and the pins being upset to provide heads between which and the enlarged ends the hub is clamped.

7. A metal wheel comprising a rim provided at its inner side with an annular hollow rib provided with openings, and spokes having enlarged ends contacting with the inner side of the rim, the spokes being provided at said ends with pins passing through the openings, and the pins being upset to provide heads between which and the enlarged ends the rim is clamped.

In testimony whereof I affix my signature.

JAMES M. JONES.